Dec. 1, 1931.  A. B. BOOTH  1,834,675
STEERING FOR TRACTORS
Filed Oct. 30, 1930  4 Sheets-Sheet 1
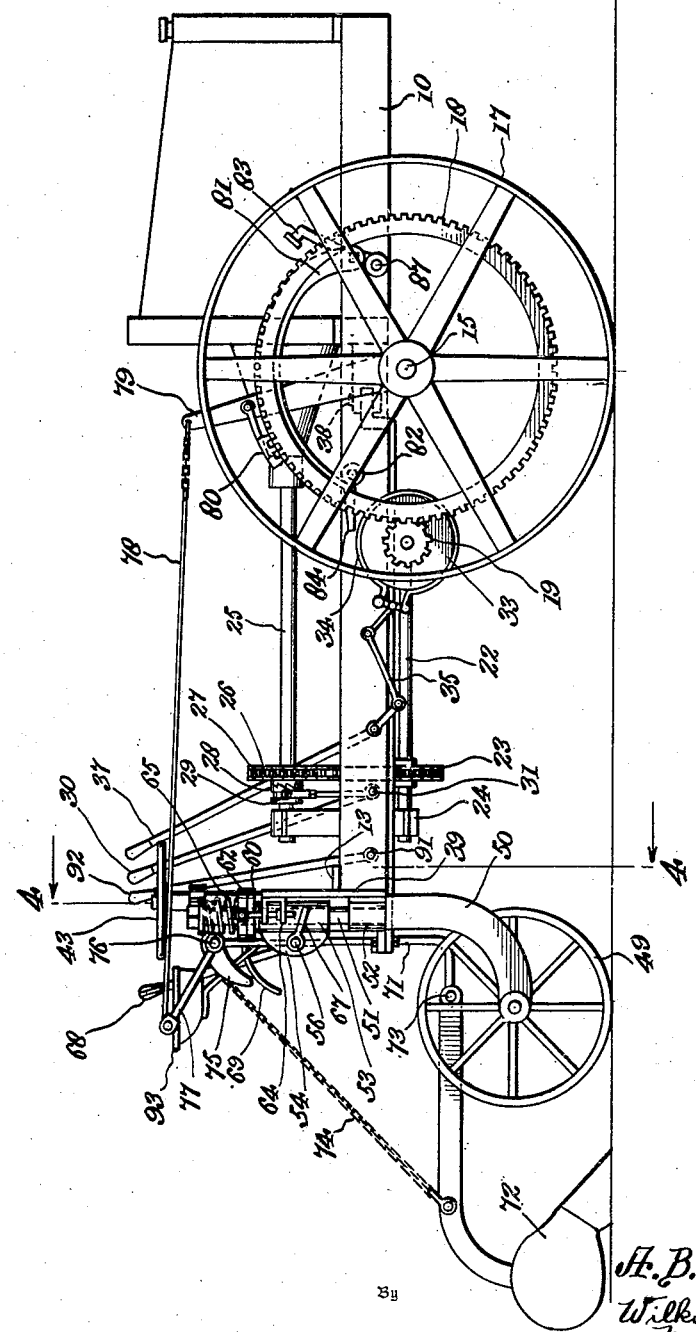

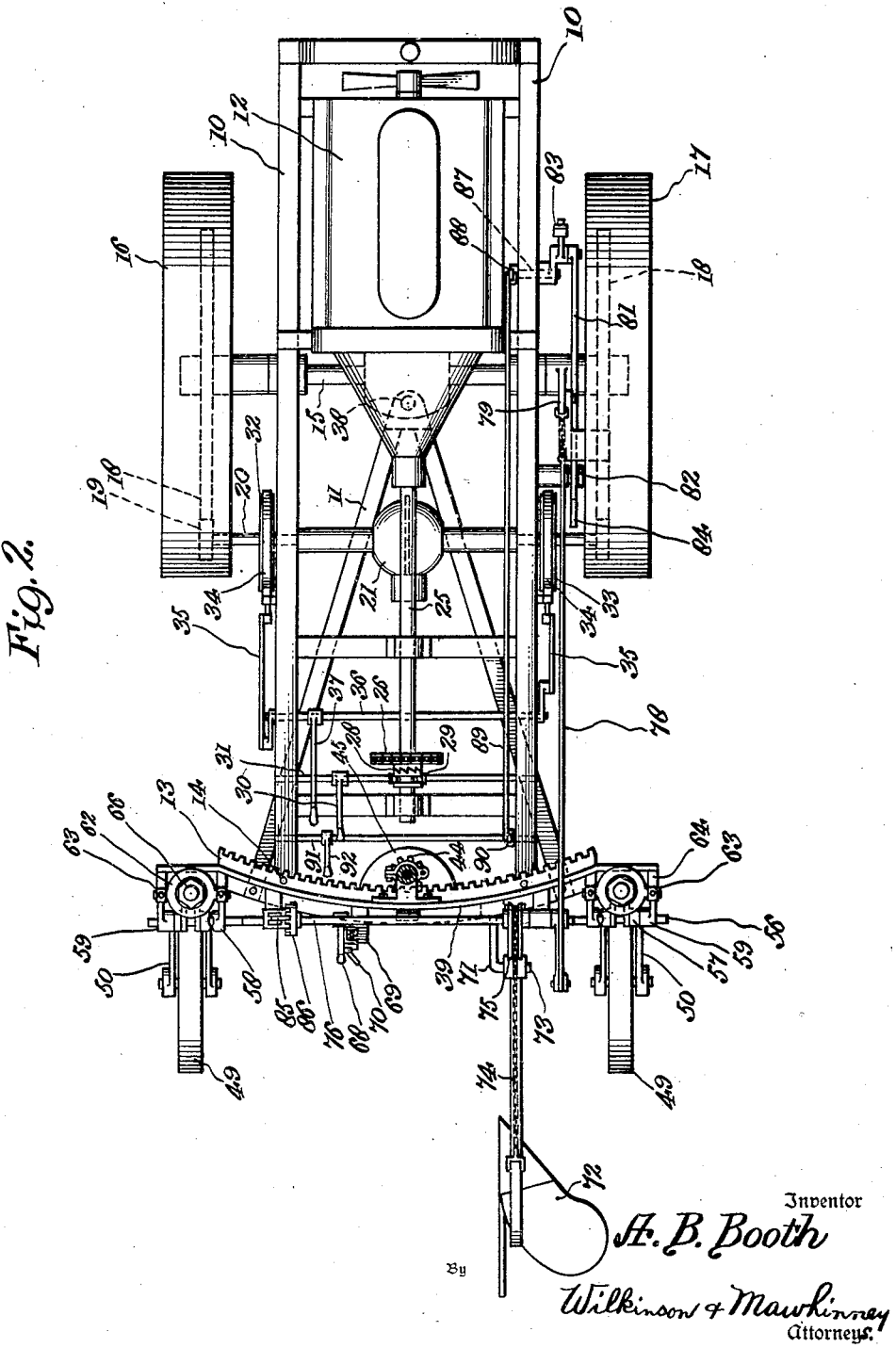

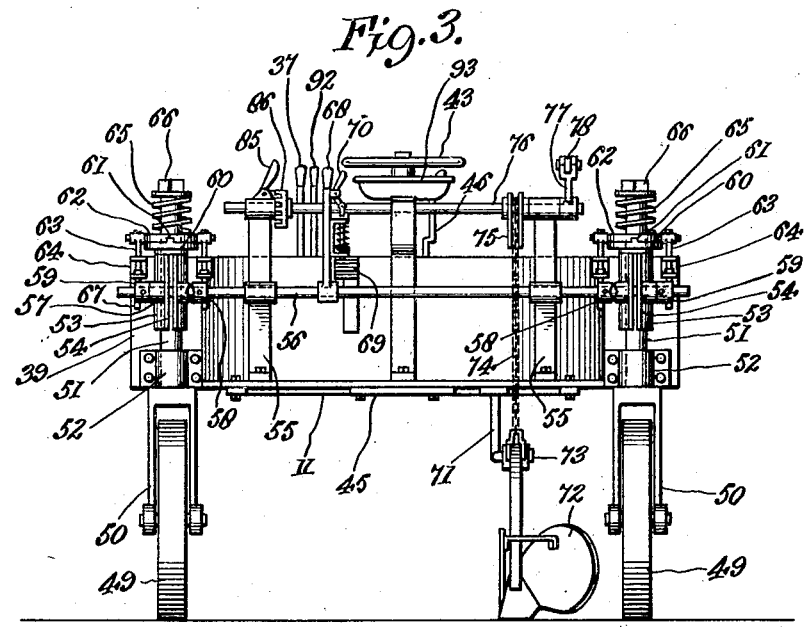

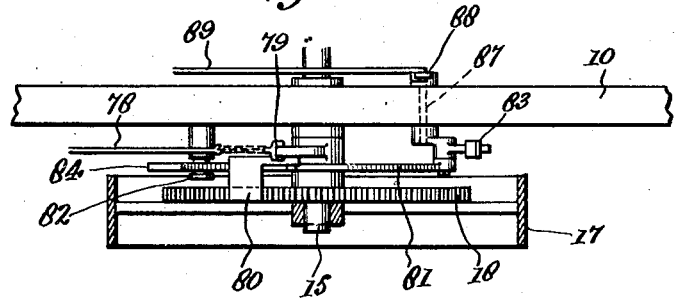
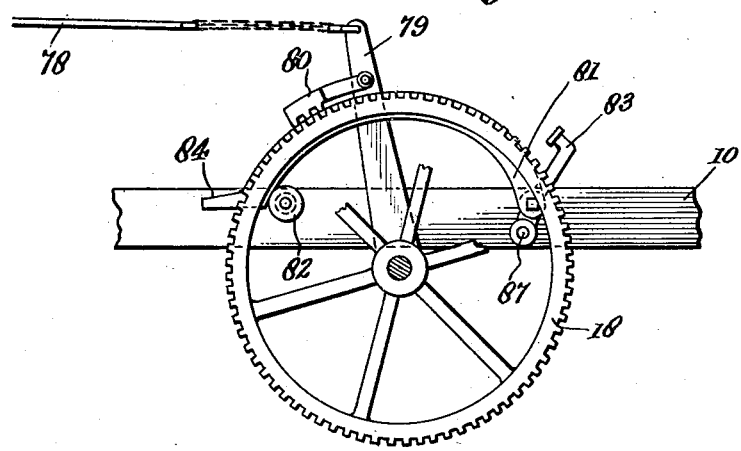
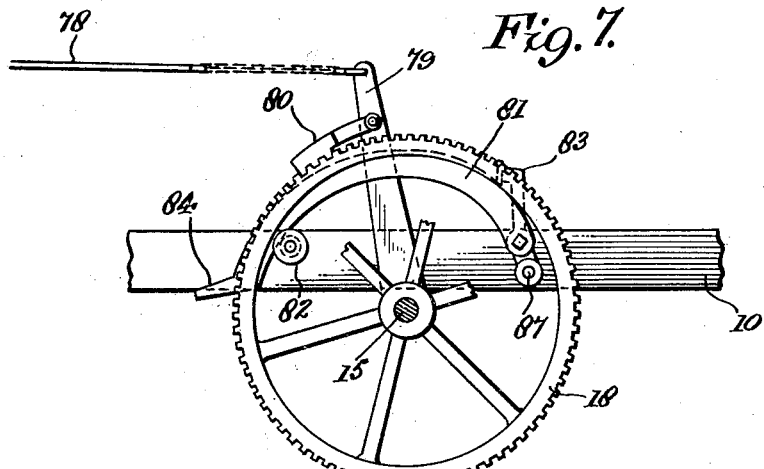

Patented Dec. 1, 1931                                                                                              1,834,675

UNITED STATES PATENT OFFICE

ANDREW BRADFORD BOOTH, OF NATALBANY, LOUISIANA

STEERING FOR TRACTORS

Application filed October 30, 1930. Serial No. 492,334.

The present invention relates to tractors, and has for an object to provide a tractor adapted particularly for farm work and provided with means for carrying one or more plows or other desired tools around working implements.

Another object of the invention is to provide a tractor with steering means admitting of the short turning of the tractor on substantially one of its traction wheels as a center so as to swing the tractor entirely around at the end of a furrow and to bring it into proper alignment with an adjacent furrow.
A further object of the invention is to provide a secondary steering means for the tractor operable independently of the above described short turning means for maintaining the tractor in true alignment with a furrow or the like and admitting of the ordinary steering of the tractor in transporting it from place to place.

The invention still further aims to provide means for definitely determining and holding the tractor in true alignment after the above referred to short steering mechanism has operated, and additionally to provide the tractor with locking means for holding parts of the short turning means inoperative during the operation of the secondary steering means.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of a tractor constructed according to the present invention.

Figure 2 is a top plan view of the same.

Figure 3 is a rear elevation of the tractor.
Figure 4 is a transverse section taken through one end thereof substantially on the line 4—4 of Figure 1.

Figure 5 is a fragmentary enlarged horizontal section taken through one of the drive or traction wheels of the tractor, showing the adjacent lifting mechanism for the earth working implement.

Figure 6 is a fragmentary side elevation of the same with certain parts removed, and
Figure 7 is a like view showing the parts in a different position than is shown in Figure 6.

Referring now to the drawings, 10 and 11 designate a pair of frames. The main frame 10 is the forward frame and many comprise spaced side bars with suitable cross sills or bars as shown for re-inforcing the frame 10 and supporting the various parts to be mounted on the main frame. The forward end of the main frame 10 is provided with a suitable motor 12 shown diagrammatically and as represented by the hood, radiator and other elements included in the power plant.

On the rear end of the main frame 10 is mounted a horizontal curved or arcuate rack bar 13 which extends transversely of the frame and which has its teeth projecting forwardly and which is provided with a smooth bearing surface at its rear side. The rack bar 13 is secured by rivets 14 or the like to the rear ends of the side bars of the main frame 10.

Toward the forward end, the main frame 10 carries a transverse axle 15 on the opposite ends of which are mounted traction wheels 16 and 17 provided at their inner sides with large drive gears 18 intermeshing with pinions 19 mounted on the opposite ends of a drive shaft 20 which is supported upon the main frame 10 and provided at an intermediate point with a suitable differential gear mechanism 21. Extending rearwardly from the differential gear mechanism 21 is a shaft 22 which carries a sprocket gear wheel 23 near its rear end and which has bearing in a vertically disposed bracket 24 mounted on the main frame 10.

The upper end of the bracket 24 supports the rear end of a drive shaft 25 which is arranged above and substantially in parallel relation to the shaft 22 and which extends forwardly to the motor or particular plant 12 as clearly shown. The drive shaft 25 is provided with a sprocket wheel 26 arranged in line with the lower sprocket wheel 23, and the two sprocket wheels are connected together by a suitable chain 27.

The sprocket wheel 26 may be free on the shaft 25 and optionally connected thereto through a suitable clutch collar 28 or the like operable through a yoke 29 adapted to be swung by a hand lever 30. The hand lever 30 is carried upon a transverse shaft 31 mounted in the main frame 10 and the shaft is suitably connected to the yoke 29 so that upon the turning of the shaft the yoke is shifted to move the clutch collar 28 into and out of interlocking engagement with the sprocket wheel 26.

The opposite sections of the differential shaft 20 are provided with independent brake drums 32 and 33 each provided with conventional brake bands 34 connected by rods 35 in reverse order to a transverse shaft 36 also mounted in the main frame 10 and adapted to be turned in opposite directions by a hand lever 37. It is apparent that the hand lever may be moved to a neutral position for releasing both of the brake drums 32 and 33, and may be moved in either direction from its neutral position to bind a selected brake drum and maintain the opposite one released so that either one or the other of the drive wheels 16 and 17 may be anchored to serve as a pivot about which the tractor may be turned by the power transmitted through the free drive wheel. This mechanism thus effects the short turning of the tractor by swinging the same bodily around upon the anchored traction wheel.

The secondary or rear frame 11 is disposed beneath the rear end portion of the main frame 10 and preferably converges forwardly and is pivotally connected at 38 by a king pin or the like to the longitudinal and transverse central portion of the main frame 10 as clearly shown in Figure 2. Across the rear end of the frame 11 is disposed a curved or arcuate bearing plate 39 adapted to engage the rear bearing surface of the rack bar 13 to support the same and admit of the transverse shifting of the rack bar 13 when the frames 10 and 11 are relatively adjusted.

The curved plate 39 is provided with a supporting bracket 40 at its forward concave side and intermediate the ends of the plate 39 to support a steering post 41 in which is disposed a shaft 42 provided on its upper end with a hand wheel 43 and on its lower end with a pinion 44 disposed in intermeshing engagement with the rack bar 13. The lower portion of the plate 39 carries a bracket 45 providing a bearing for the lower end of the steering shaft 42 for holding the pinion 44 against the rack bar 13 and thus maintaining the rack bar and the guide plate in bearing contact one with the other.

A locking rod 46 is slidably mounted at one side of the steering post 41 by means of brackets 47 also mounted on the plate 39 for holding the lower end of the rod in line with the throats of the teeth of the pinion 44 so that when the rod 46 is shifted downwardly the lower end of the rod will interlock with the teeth of the pinion and hold it from turning. A finger lever 48 is connected to the upper end of the rod 46 and is pivotally supported upon the steering post 14 in close proximity to the hand wheel 43 so that the operator may lock the steering mechanism in adjusted position.

The hand wheel steering mechanism is utilized for ordinary steering purposes wherein the frames may be relatively moved so as to articulate the frames for the purpose of changing the general direction of travel of the tractor where the turning is on a long radius. This hand operated steering mechanism is locked by the rod 46 when the shaft steering mechanism above described is to be operated.

The rear end of the tractor is supported by a pair of castor wheels 49. These wheels are located at the rear corners of the tractor and each is mounted in a fork 50 which has an upstanding pin or shank 51 mounted in bearings 52 secured to the rear sides and opposite ends of the curved plate 39.

Each shaft 51 extends above its bearing 50 and through a split sleeve 53 carried at the rear side of the plate 39 and having rearwardly extending spaced ears 54. The frame 11 also carries, at the rear side of the curved plate 39, a pair of upstanding bracket arms 55 in which is journaled a transverse shaft 56, and the ends of the shaft 56 extend through the ears 54 of the sleeves 53.

Fixed to the opposite outer sides of the ears 54 are bosses 57, the bosses at the inner sides of the sleeves 53 having cam ends for co-operation with correspondingly formed cam collars 58 which are fixed upon the shaft 56 and adapted to move the cam bosses 57 outwardly to compress the ears 54 and contract the sleeves 53 when the shaft 56 is turned. The outer end portions of the shaft 56 carry stop collars 59 adapted to engage the outer bosses for holding the same against shifting lengthwise of the shaft 56.

Above each split sleeve 53, the shaft 51 is provided with a locking disc 60 keyed or otherwise suitably secured to the shaft to turn therewith and provided on its upper face with a raised lug or projection 61 adapted to engage in a correspondingly formed slot or depression in an upper locking disc 62. The locking disc 62 carries at opposite sides a pair of downwardly extending rods 63 slidable in brackets 64 to hold the upper disc 62 from turning with the shaft 51 and also for raising the disc 62 at times against the tension of a spring 65 surrounding the upper end of the shaft 51 and adjusted as to compression by a nut 66 carried on the upper end of the shaft 51. The spring 65 acts between the nut 66 and the upper face of the disc 62 for normally urging the latter downwardly into interlocking engagement with the lower disc 60.

The collars 58 and 59 are provided at their forward sides with outstanding arms 67 adapted to engage the lower extremities of the rods 63 for elevating the latter after the shaft 56 has been turned to a predetermined extent. From Figure 1 it will be noted that there is a clearance between the arms 67 and the lower ends of the rods 63. This is to provide a lost motion between the shaft 56 and the two types of shaft locking means, the split sleeve 53, and the locking discs 60 and 62. The purpose being that one of these locking means is released prior to the engagement of the other as will subsequently appear.

Each shaft 51 is equipped wth this double locking mechanism, and these mechanisms are operated simultaneously and equally by means of the shaft 56. The shaft 56 carries a hand lever 68 which extends upwardly and traverses a toothed sector 69 for interlocking engagement with a latch 70 carried by the lever 68 for locking the latter in various angularly adjusted positions.

The lower rear frame 11 is provided on its rear end with a downwardly and rearwardly extending implement bracket 71 to which may be connected the beam of a plow 72, or other desired earth working implement, the implement being connected by means of a pivot 73 to the bracket 71. A chain, or other flexible connection 74, is attached at one end to the implement 72 in spaced relation to the pivot 73, the chain 74 extending upwardly and over a shoe 75 carried upon a shaft 76 adapted to be turned for swinging the shoe 75 upwardly and forwardly to draw the chain 74 upwardly and forwardly and thus raise the plow or other implement 72.

The invention provides means for automatically turning the shaft 76 and raising the implement. To this end, the shaft 76 carries an arm 77 which extends generally in an upward direction and which is pivotally connected at its outer end to a rod 78 which is carried forwardly of the tractor and suitably connected at its forward end to a pull lever 79. The lever 79 is pivotally mounted upon the axle 15 adjacent the inner side of one of the traction wheels, such as the wheel 71. The lever 79 carries a pivoted lifting dog 80 arranged to overlie and intermesh with the teeth of the large gear wheel 18 so that at times the dog 80 may engage the teeth of the gear wheel 18 and thus by the rotation of the traction wheel 17 swing the lever 79 forwardly until the dog 80 is disengaged from the teeth of the gear wheel 18.

The releasing means for the dog 80 comprises a curved lifting bar 81 which is disposed in close proximity to the gear wheel 18, at the upper portion thereof and held in substantially concentric relation thereto by a roller 82 suitably mounted upon the adjacent side of the frame 10 and by a trip lever 83 to which the end of the bar 81 is pivotally connected. By an inspection of Figures 6 and 7 it will be noted that when the trip lever 83 is moved forwardly or outwardly with respect to the axis of the gear wheel 18, the lifting bar 81 is raised so that its outer edge is substantially flush with the outer ends of the teeth of the gear wheel 18 so as to lift the dog 80 out of engagement with the gear wheel and permit the dog to slide freely over the free edge of the lifting bar 81. In this manner, the lifting lever 79 is permitted to swing back into initial position, at which time the earth working implement is lowered into the ground.

If desired, the rear end of the lifting bar 81 may be provided with a supporting or stop projection 84 adapted to receive the dog 80 thereon when the lever 79 is swung back into its full lowered position. The trip lever 83 is provided upon its upper end with a projection or head arranged in transverse alignment with the forward edge portion of the pull lever 79 and, when the trip lever 73 is set or swung backwardly as shown in Figure 7, the pull lever 79 is adapted to strike the trip lever and swing the latter forwardly into the position shown in Figure 6.

It is apparent that as soon as the trip lever 73 is swung forwardly the dog 80 is raised out of the teeth 18 of the gear wheel so that the gear lever 79 is free to move back under the weight of the earth working implements 72 and also under the control of a handle 85. The handle 85 is carried on the upper end of one of the brackets 55 and has a projection adapted to interlock selectively in the notches of a sector 86 which is secured to the transverse shaft 76. Thus, the lever 85 may be operated to lock the shaft 76 at desired points of angular adjustment so as to hold the earth working implements 72 at the desired height in the ground, or above the ground when not in use.

The trip lever 83 is mounted on a pivot rod or shaft 87 which is carried through the adjacent side bar of the frame 10 and which has a radially extending arm 88 at the inner side of the frame to which is pivotally connected a rod 89. The rod 89 is carried rearwardly along the inner side of the frame to a radial arm 90 mounted on a transverse shaft 91 also mounted in the main frame 10 and provided with an upstanding hand lever 92 by means of which the shaft 91 may be turned so as to operate the trip lever 83 at any desired point during the forward swinging movement of the pull lever 79. Thus, the operator is enabled to control the distance through which the pull lever 79 is carried by the gear wheel 18.

In use, the normal operation of the tractor calls for the adjustments which are shown in Figures 1 and 2. In this instance the earth working implement 72 is lowered, the pull lever 79 is in its rear position, depending upon the height of the earth working implement 72, and the trip lever 83 is in its forward position for holding the curved bar 81 raised to prevent the dog 80 from dropping down into engagement with the teeth of the gear wheel 18. Also, the castor wheels 49 are held from swinging by manipulation of the handle 68 and shaft 56 so that the sleeves 53 are contracted against their inherent resiliency and the upper discs 62 are maintained elevated by the lifting arms 67.

To admit of the normal steering operation of the tractor for maintaining it in proper line with the furrow, and to bring it gradually back into line upon deviation therefrom, and to also control the direction of movement of the tractor on curves of large radius, the operator raises the locking rod 46 and operates the hand wheel 43 to turn the pinion 44 and slide the curved rack bar 13 back and forth against and relatively to the plate 39. Thus, the frames 10 and 11 are adjusted relatively to each other and about the pivot 38. This operation and construction provides an articulated frame wherein the drive or traction wheels 16 and 17 are maintained in parallel relation and the rear castor wheels 49 are also maintained relatively in parallel relation, while the transverse axes of rotation of these two sets of wheels are adjusted each to their angular relation so as to effect the desired turning or straight line movement of the tractor.

As before stated, when it is desired to turn the tractor completely about and on a relatively short radius, it is only necessary to manipulate the lever 37 for locking one of the traction wheels, 16 or 17, with the result that the driving force is transmitted through the differential mechanism 21 to the opposite or free traction wheel and the latter therefore swings the complete tractor body around on the fixed, or substantially fixed, pivot defined by the point of contact of the locked traction wheel.

During this short turning movement it is necessary to first move the locking rod 46 down and hold the hand controlled steering mechanism in locked or fixed position. It is also essential at this time to manipulate the lever 68 and the shaft 56 so as first to expand the sleeves 53 and permit the castor shafts 51 to turn freely so that the castor wheels 49 may trail the rear end of the body as the latter swings on its short radius. It is also essential to manipulate the handle 68 so as to release the top disc 62 after the bottom disc 60 has been turned with the shaft 51 a distance sufficient to offset the projection 61 from its seat or slot in the disc 62.

The result of this adjustment is that the castor wheels 49 may trail freely and swing into various angular positions on the rear end of the tractor body without in any way offering resistance to turning or distorting the relations between the frames 10 and 11. As soon however as the tractor has been turned to the desired extent on its short radius and the brake drums 32 and 33 are simultaneously released, the power is equally transmitted to the traction wheels 16 and 17 so that the tractor as a body is advanced in a general forward direction. The correct alignment or positioning of the castor wheels 49 at the rear end of the frame may then be determined before the castor wheels are locked in position. This is determined by a snapping or clicking noise effected by the springing downwardly of the upper discs 62 when the projections 61 of the lower discs are turned into registry therewith. The projections 61 also maintain the castor wheels in the desired straight line position and until the operator is free to manipulate the lever 68 for contracting the sleeves 53 and thus bind the castor wheels and all its parts firmly on the rear frame and to prevent vibration and noise incident to any loose play between the parts.

When it is desired to raise the earth working implement 72 out of the ground or at a suitable elevation for transportation, it is only necessary that the operator manipulate the hand lever 92 for swinging the trip lever 83 backwardly into the position shown in Figure 7. At this time the curved bar 81 is lowered and the lifting dog 80 is free to drop into engagement with the teeth of the gear wheel 18. The gear wheel is thus interlocked with the lifting lever 79 and the latter is turned with the gear wheel and the adjacent traction wheels 17 directly through the transmission mechanism from the source of power 12.

When the desired height of the earth working implement is reached, the operator may swing the lever 92 and move the trip lever 83 forwardly into the position shown in Figure 6 before the pull lever 79 reaches its forward limit of movement.

Should the pull lever 79 be permitted to move through the entire extent of its movement, it will strike the trip lever 83 and move the same forwardly into the position shown in Figure 6 whereupon the dog 80 will be automatically released and the pull lever 79 permitted to swing backwardly under the weight of the earth working implement 72.

It is obvious that various changes and modifications may be made in the details of construction and design of the above specifically described embodiment of this invention without departing from the spirit thereof, such changes and modifications being restricted only by the scope of the following claims.

What is claimed is:—

1. In a tractor, front and rear pivotally connected frames, a pair of traction wheels mounted on the front frame, independent reversely connected brakes for said traction wheels for optionally holding the same against turning to provide a pivot about which the tractor may be swung, a pair of castor wheels mounted on the rear frame and having upstanding shafts, compressible sleeves carried by the rear frame and engaging said shafts, manual means for contracting said sleeves to bind on the shafts and hold the castor wheels against swinging, a spring actuated locking means for determining the aligned positions of said castor wheels with the rear frame, and connections between said spring actuated means and said manual means for releasing the spring actuated means when said sleeves are contracted.

2. In a tractor, a main frame, traction wheels carried by the main frame, reversely connected braking means for the traction wheels to selectively hold the same one at a time against turning to swing the tractor about one of the wheels as a pivot, a rear frame pivotally connected to the front frame, a rack bar carried by the front frame, a steering shaft carried by the rear frame, a pinion mounted on the steering shaft meshing with said rack to relatively move the frames when said steering shaft is turned, castor wheels mounted on the rear frame adapted to swing with the tractor when one of said traction wheels is anchored, spring means for latching said castor wheels in alignment with the rear frame when the swinging movement is completed, binding means for holding said castor wheels against swinging and manual means connected to said spring and binding means for alternately and selectively actuating the same.

3. In a tractor, a pair of pivotally connected frames, traction wheels on one frame, castor wheels on the other frame provided with upstanding shafts, steering means interconnecting the frames for relatively swinging the same, a split sleeve arranged upon each of said shafts and connected to the castor wheel frame, a transverse shaft, cams on said transverse shaft for contracting said sleeve, a disc keyed to each of said castor wheel shafts and having a projection, a second disc on each castor wheel shaft having a recess for receiving the projection, a spring on each castor wheel shaft for urging the discs together for interlocking the same with said projections, and separating means for the discs connected to said transverse shaft for disengaging the same upon operation of the shaft.

ANDREW BRADFORD BOOTH.